July 19, 1966
G. L. CAMPBELL ETAL
3,261,218
MOTOR OPERATED CONTROL DRIVE
Filed Oct. 3, 1963
6 Sheets-Sheet 1
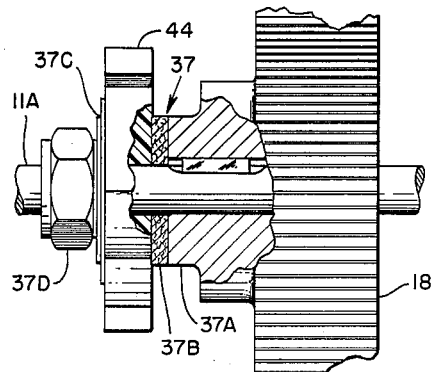
FIG. 2
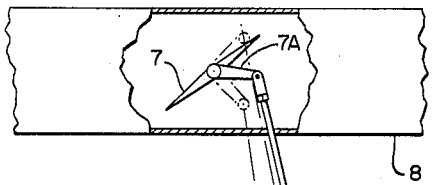
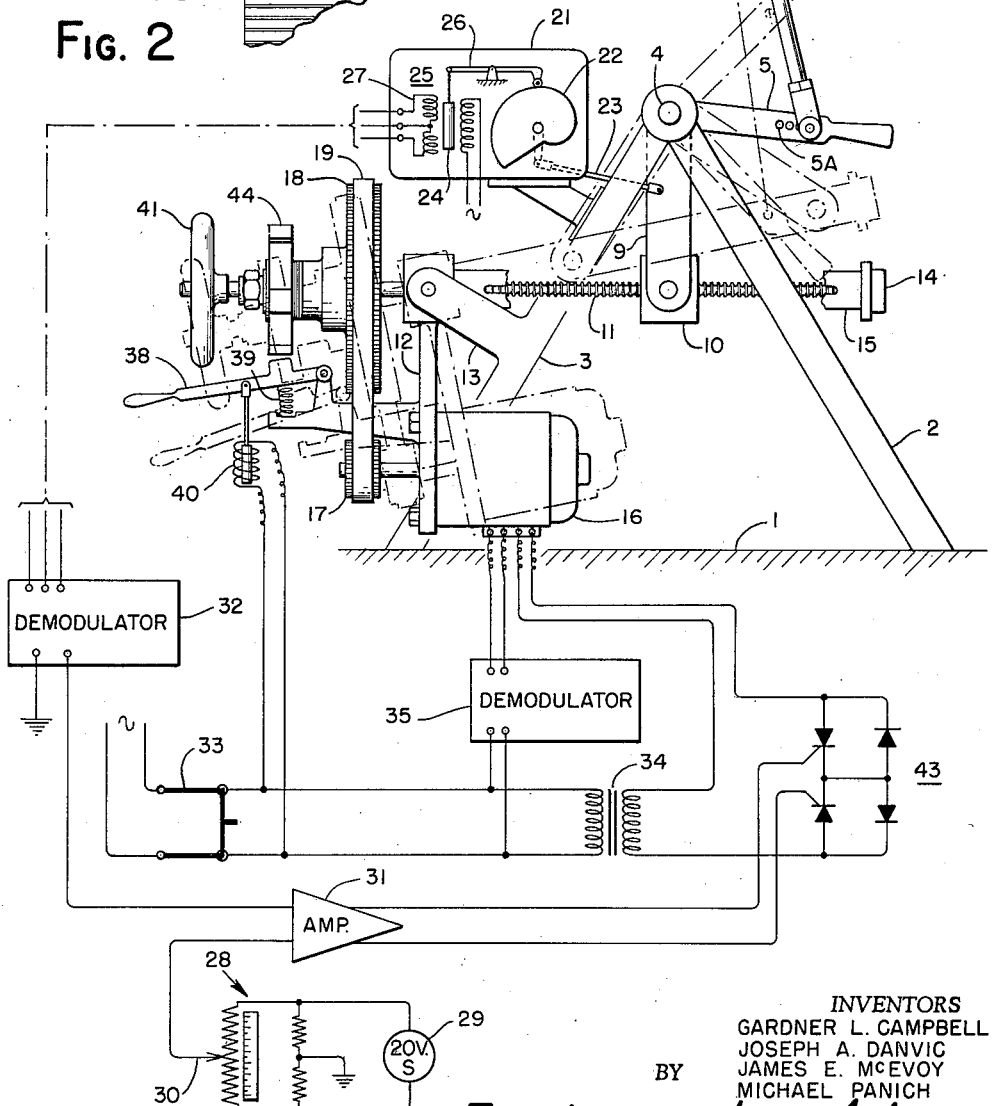
FIG. 1
INVENTORS
GARDNER L. CAMPBELL
JOSEPH A. DANVIC
JAMES E. McEVOY
MICHAEL PANICH
BY
ATTORNEY

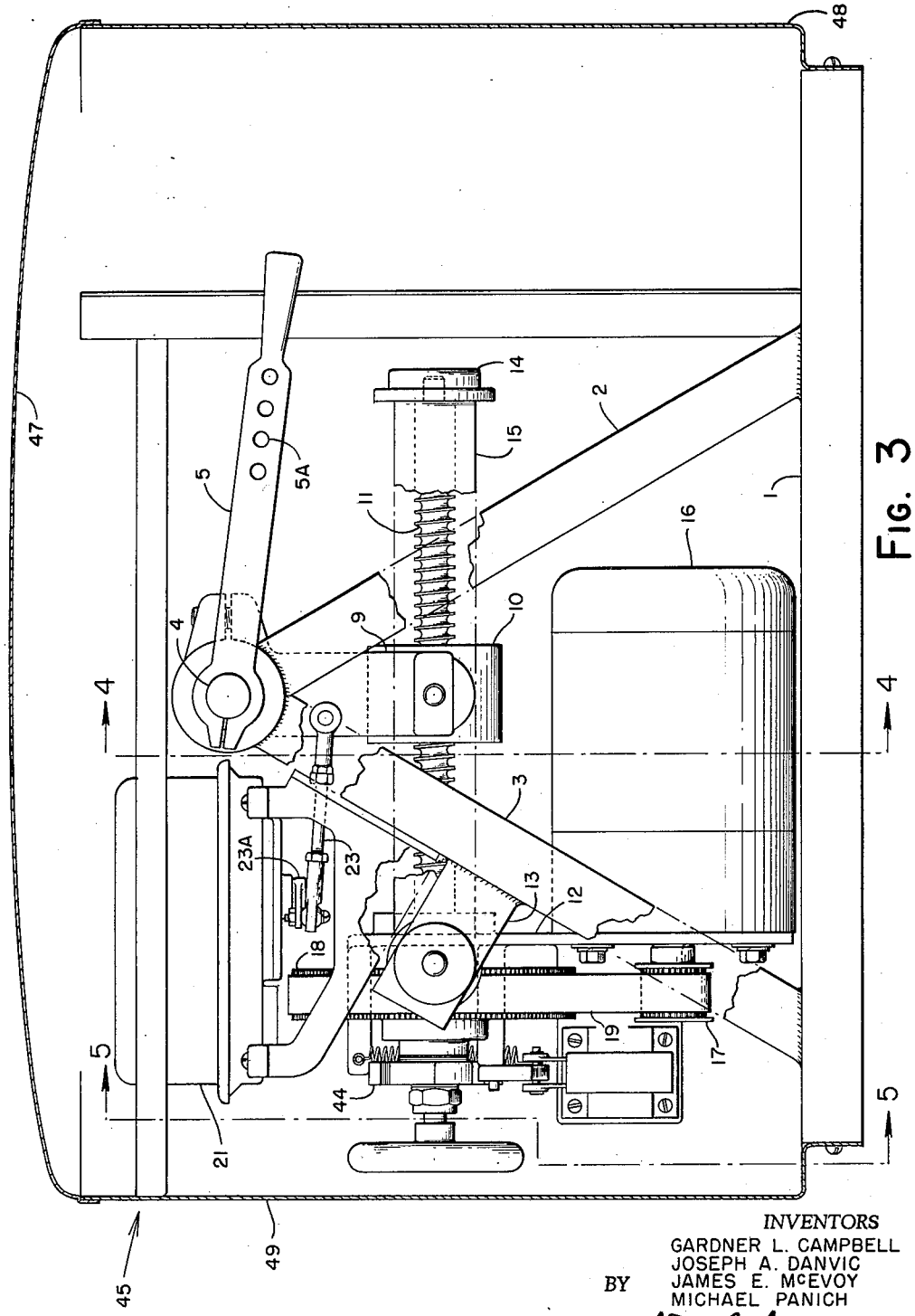

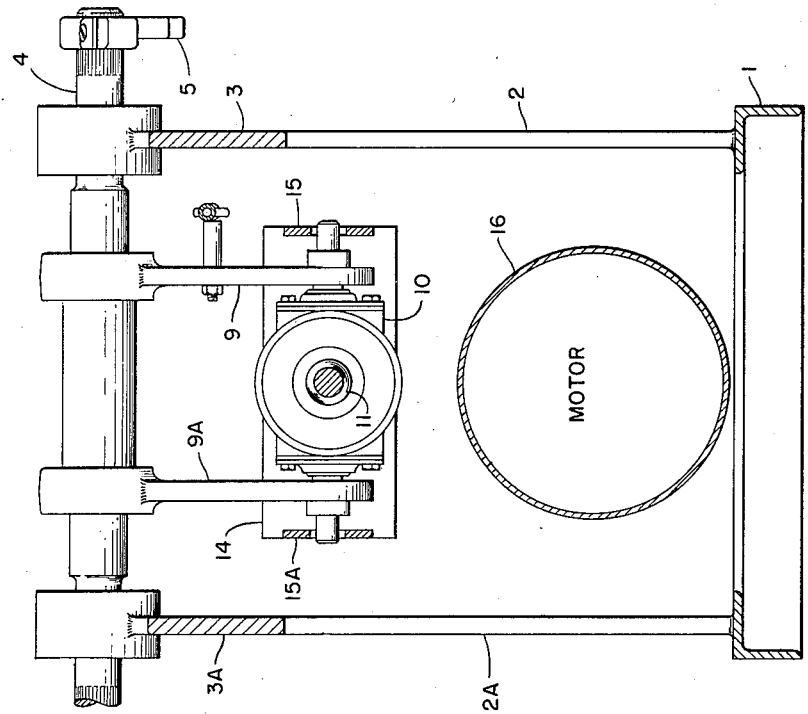
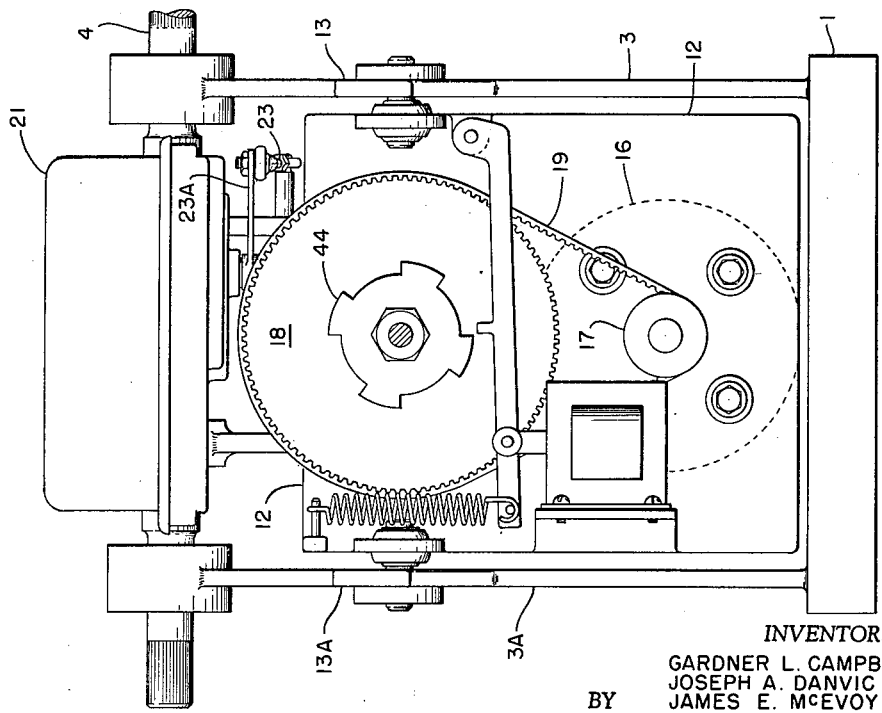

INVENTORS
GARDNER L. CAMPBELL
JOSEPH A. DANVIC
JAMES E. McEVOY
MICHAEL PANICH
BY
*John F. Luhrs*
ATTORNEY

United States Patent Office 3,261,218
Patented July 19, 1966

3,261,218
MOTOR OPERATED CONTROL DRIVE
Gardner L. Campbell, Wickliffe, Joseph A. Danvic, Cleveland, James E. McEvoy, South Euclid, and Michael Panich, Willoughby, Ohio, assignors to Bailey Meter Company, a corporation of Delaware
Filed Oct. 3, 1963, Ser. No. 313,461
8 Claims. (Cl. 74—89)

Our invention relates to control drives for positioning regulating devices such as dampers, fans, inlet vanes, valves, turbine governors, rheostats or the like.

More particularly our invention relates to a modulating electric motor operated control drive wherein the motor is controlled by an electric signal which may be generated automatically or manually.

One object of our invention is to provide a control drive which may be easily installed in power and process plants.

A further object of our invention is to provide a control drive which may be constructed in a variety of sizes to provide a wide range of output torques.

A further object of our invention is to provide a control drive incorporating a quick changeover from an electric motor drive to a manual drive without loss of position.

A further object of our invention is to provide a unique medium for the conversion of the relatively high speed, low torque of an electric motor to a relatively high torque, low speed.

Still another object of our invention is to provide a compact mechanism of sturdy construction which may be readily packaged in a protective housing.

While there have been available satisfactory control drives operated by pneumatic or hydraulic power, a corresponding control drive operated by an electric motor suitable for industrial applications has not been available. One basic difficulty in providing such a drive has been the incompatability of an electric motor, which is essentially a high speed, low torque device with the output requirements of relatively high torque and low speed. While motor operated drives suitable for special applications have been available, a universal drive adaptable to a wide range of applications and utilizing standard components has not been available. By our unique construction the relatively low torque, high speed output of a motor is converted to a high torque, low speed movement satisfactory for positioning a wide variety of regulating devices found in power plants and industrial processes such as dampers, valves, inlet vanes, rheostats, hydraulic couplings and the like.

In the drawings:

FIG. 1 is a schematic elevation view of our control drive with some parts turned from true position.

FIG. 2 is a fragmentary view of the friction brake incorporated in the control drive shown in FIG. 1.

FIG. 3 is a side elevation view of a commercial embodiment of our control drive.

FIG. 4 is an elevation view taken along the line 4—4 of FIG. 3 in the direction of the arrows.

FIG. 5 is an elevation view taken along the lines 5—5 of FIG. 3 in the direction of the arrows.

Figure 6:
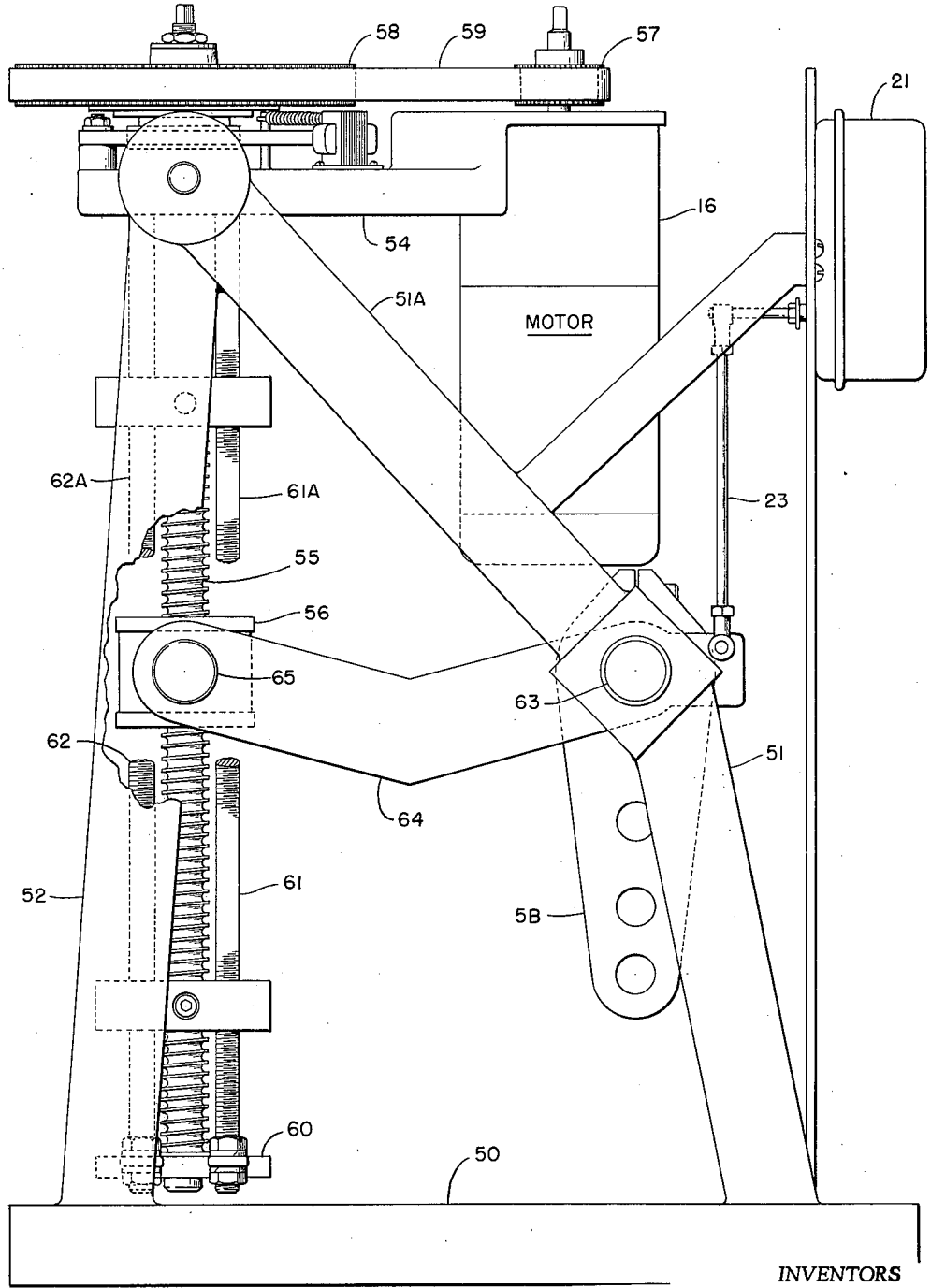
FIG. 6 is side elevation view of a modified form of our control drive having a higher torque output than the drive shown in FIG. 3.
Figure 7:
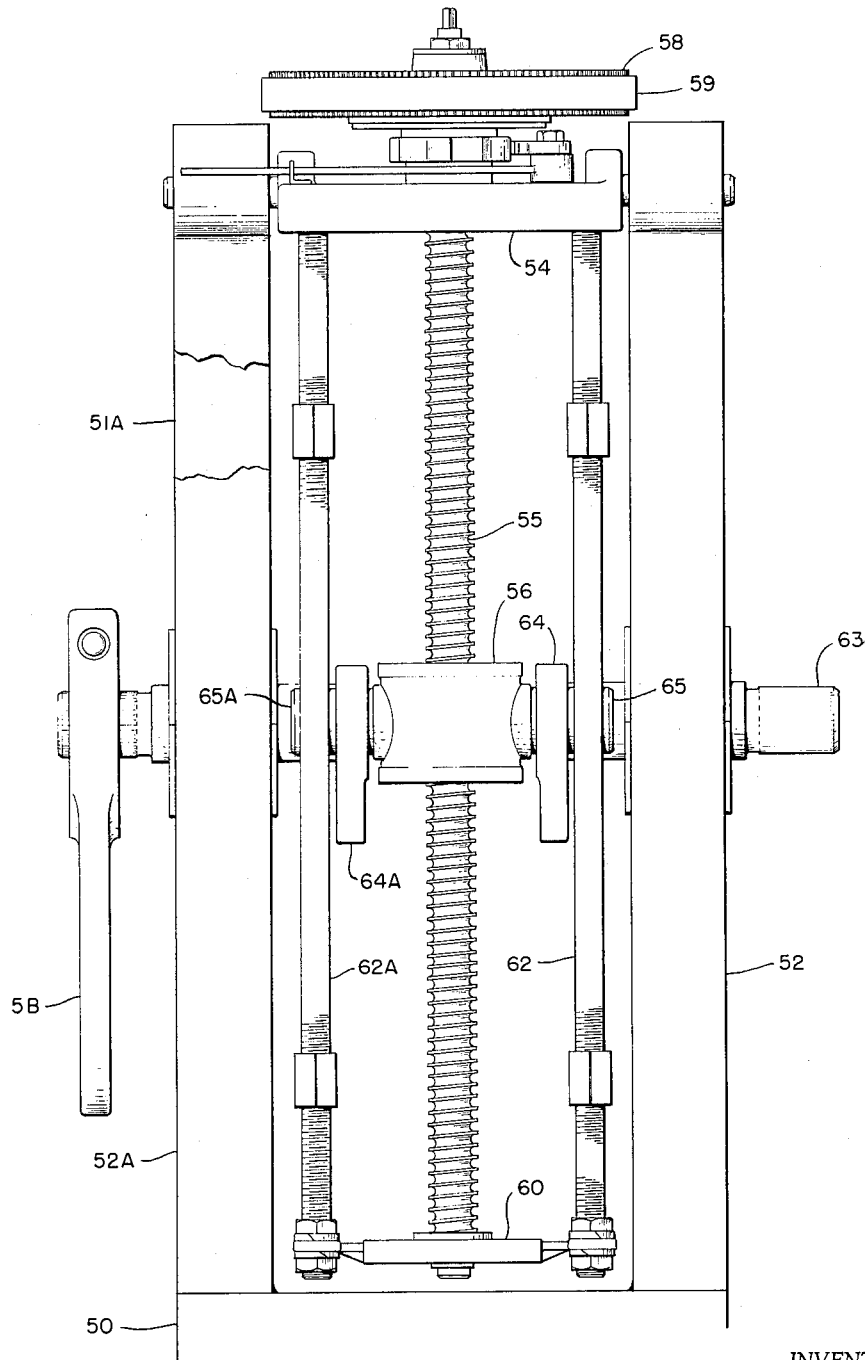
FIG. 7 is an end elevation of the control drive shown in FIG. 6.

Referring now to FIGS. 1–5 inclusive, we therein show an A-frame for supporting the drive mechanism comprising a base 1 on which are mounted legs 2, 3 and 2A, 3A. Each pair of legs 2, 3 and 2A, 3A, with the base 1, forms an isosceles triangle. Journaled in the legs at the apex of the triangles is a shaft 4 splined at both ends for receiving on either end an output drive arm such as shown at 5.

By way of an application example, we show in FIG. 1 the output drive arm 5 pivotally connected to a connecting rod 6 for positioning a damper 7 in a conduit 8. Normally about 90° angular movement is required to position the damper 7 from closed to open position and a corresponding angular movement is required of drive arm 5. We have shown the drive arm 5 used to position the damper merely by way of specific example of one of the many applications of our control drive.

Further, as shown in FIGS. 1 and 3, the drive arm 5 may be provided with a plurality of bearing holes 5A for reconciling the effective length of the drive arm with the length of the damper drive arm 7A.

Secured to the shaft 4 are spaced apart parallel arms 9 and 9A forming a trunnion bearing for a ball nut 10 which may be, for example, of the general type shown in United States Patent 3,053,105. The nut 10 engages a screw 11 so that as the screw is rotated in one direction the nut is moved with rectilinear motion from left to right as shown in the drawings and when the screw is rotated in opposite direction from right to left.

The screw 11 is rotatably mounted in a mounting plate 12 which is pivotally mounted in arms 13 and 13A, extending from legs 3 and 3A. The opposite end of screw 11 is rotatably mounted in a base plate 14 carried by arms 15 and 15A secured to the mounting plate 12.

Screw 11 is rotated in forward and reverse directions by a motor 16, supported on mounting plate 12, through a timing belt drive comprising a drive sprocket 17, secured to the shaft of motor 16, a driven sprocket 18 secured to an extension of the screw 11 and a ribbed timing belt 19. To provide an initial speed reduction and corresponding increase in available torque the drive sprocket 17 is of materially less diameter than the driven sprocket 18. A further material speed reduction and increase in available torque is obtained by the combination of ball nut 10 and screw 11. Overall the reduction provides, in one commercial embodiment, a conversion from a motor speed of approximately 480 r.p.m. to a 1 r.p.m. speed of output arm 5.

A feature of our invention resides in the means in which we have provided for the translation of the rectilinear movement of the ball nut 10 to the rotary movement of arm 9 without change in the torque available at drive arm 5 and by means of a simple rugged construction. By supporting the screw 11 and motor 16 on pivoted mounting plate 12, as the arm 9 is driven from the position shown, the screw and motor are free to tilt as required to maintain a free driving relationship, while at the same time maintaining a constant effective length of arm 9. Thus, at the limits of travel (approximately 45° either way from the position shown) of the arm 9, the screw 11 and mounting plate 12 will assume positions as shown in dotted outline in FIG. 1.

The particular circuit for control of the motor 16 is determined by the application of the drive. That is, in some cases, a simple circuit employing manually operable "Open" and "Close" pushbuttons may suffice. In other cases, it may be desired to have the drive positioned in accordance with an electric signal, manually or automatically generated. In FIG. 1, by way of an example of the latter, we have shown a solid state control circuit for the motor 16 illustrated and described in greater detail in co-pending application Serial No. 335,065, filed January 2, 1964. While it will be evident that the circuit may be designed for any desired control signal range, we have shown the circuit arranged for an input signal having a range of −10 to +10 volts. Ordinarily the operation of the motor 16 would be arranged so that at −10 volts the regulated device, such as the damper 7, would be fully closed and fully open at +10 volts. At any intermediate signal voltage a corresponding unique position is assumed by the damper 7.

As is common in the art, to obtain the desired relationship between input signal and drive position a feedback signal derived from drive position is compared to the control signal and the drive positioned until the two are equal or stand in predetermined relationship to each other. To obtain the feedback signal we provide a positioner 21 mounted on arm 3. Incorporated in the positioner 21 is a rotatable cam 22 angularly positioned from arm 9 by means of pivoted link 23 and lever 23A. Movable core 24 of a transformer 25 is positioned by the cam 22 through a cam follower 26. When the primary winding thereof is energized by a suitable source of alternating current, a voltage is produced in secondary windings 27 corresponding to the position of arm 9 and accordingly of damper 7. The cam 22 may be shaped to produce a desired functional relationship between the position of damper 7 and signal output of movable core transformer 25 whereby the drive may be "characterized" so that a given change in signal input will produce any desired change in position of the damper 7.

The control circuit we have shown in FIG. 1 is arranged for the control of a shunt-wound D.-C. motor 16, the armature winding of which is energized from a suitable source of A.-C. current through a transformer 34 and silicon control rectifiers 43. The control signal is generated by means of a potentiometer 28, energized by a suitable source of D.-C. current 29, and having a movable contact arm 30. As the contact arm is positioned a variable output D.-C. voltage is generated which, in the example selected, has a range of −10 to +10 volts. The signal so produced is transmitted to a differential amplifier 31 in which it is compared against the feedback signal from movable core transformer 25, transmitted to the amplifier 31 through a demodulator 32. The difference or error signal after amplification is used to control the silicon control rectifiers 43. The shunt winding of motor 16 is energized through a demodulator 35 connected across the energizing source of alternating current.

In operation, an error signal of one sense applied to silicon control rectifiers 43 will effect a D.-C. current flow through the armature winding of motor 16 of corresponding sense. The resulting rotation of motor 16 will be in a direction to reduce the error signal to zero. A control signal of opposite sense will effect rotation of the motor in opposite direction.

While we have indicated the motor 16 as being a direct current shunt-wound motor it is apparent that other types of motors and control circuit may be utilized. As previously discussed, in some applications the control drive motor may be provided with a simple pushbutton operated forward and reverse circuit. In other applications a series-wound motor may be desirable with a properly designed circuit therefor.

Upon loss of power, opening of line switch 33, or the like, it is desirable to have the control drive remain in its then existing position. Under some loading conditions, due to the high efficiency of the screw 11 and ball nut 10, it is possible for the drive to drift in one direction or the other depending upon the direction of loading. To prevent this, we provide a toothed wheel 44 rotatably mounted on an extension 11A of screw 11, as shown in FIG. 2. Between the toothed wheel 44 and driven sprocket 18 is a friction brake 37 comprising a disc 37A formed on sprocket 18 and a cooperating disc 37B mounted on toothed wheel 44 and urged against disc 37A by a force spring 37C, the compression of which is adjustable by means of nut 37D.

Normally held in engagement with toothed wheel 44 by a spring 39 is pivoted detent 38. Opposing the action of the spring 39 is a solenoid 40 connected in parallel with the motor 16 to the energizing source. So long as power is available and the switch 33 is in the closed position, the detent 38 will be held out of engagement, as shown in FIG. 1, with the toothed wheel 44. Upon opening of the switch 33 or loss of power, detent 38 will be pulled into engagement with toothed wheel 44 and through friction brake 37 will bring the drive to a stop. Without the friction brake 37 if the drive is in motion at the instant of engagement of detent 38 with toothed wheel 44 the entire inertia of the moving parts would be absorbed by the tooth engaged by the detent. The friction brake 37 provides a means of absorbing the inertia without putting undue strain on any of the parts thus avoiding breakage or, in the alternative, avoiding a toothed wheel and associated parts of undue size and mass.

During abnormal conditions, or while trouble shooting, or while "calibrating" the drive, that is while bringing the cam 22 to a predetermined shape, it is often desirable to rotate the screw 11 by hand. This we accomplish by providing the extension 11A of the screw 11 with a hand wheel 41. When the drive is to be manually operated, the switch 33 is opened and the detent 38 manually held out of engagement with the toothed wheel 44.

As shown in FIG. 3, the drive mechanism is preferably enclosed in a housing 45 having a removable top 47 and detachable end panels 48 and 49. A panel board 49a is provided on which components of the control circuit for the motor 16, described with reference to FIG. 1, may be mounted.

The control drive we have so far described with reference to FIGS. 1–5 is particularly suitable for output torques in the range of 100–400 ft.-lbs. with output shaft speeds of 15 seconds for 90° travel. We have found it desirable, while maintaining the same basic principle of operation, to modify the control drive for higher torque outputs. In FIGS. 6–9 we illustrate such a modified form of our control drive suitable for output torques in the range of 1600–3200 ft.-lbs. and higher. To avoid repetition in the description, where parts are substantially the same, we have identified them with the same numbers as used with reference to FIGS. 1–5. The following description is directed primarily to those modifications of significant difference and importance.

Referring to FIGS. 6–9, we show a modified A-frame construction having a base 50 and legs 51, 51A and 52, 52A, forming a deformed triangle by virtue of the segmented construction of legs 51 and 51A. Journaled in the legs of the apex of the triangles formed by the legs is a mounting plate 54 on which is mounted the motor 16 of suitable size to produce the desired drive output torque. Journaled in the mounting plate 54 and carried thereby is a substantially vertical screw 55 engaging a ball nut 56. The screw 55 is rotated in forward and reverse directions by the motor 16 through drive sprocket 57, driven sprocket 58 and timing belt 59. The lower end of screw 55 is journaled in a plate 60 carried by guide rods 61, 61A and 62, 62A, the upper ends of which are secured to the mounting plate 54. Journaled in legs 51, 51A is a horizontal output shaft 63 carrying arms 64, 64A pivotally mounted on bearings 65, 65A carried by ball nut 56. Clamped to the output shaft 63 is a drive arm 5B similar to the drive arm 5 of FIG. 3, but of heavier construction. As the motor 16 rotates in one direction ball nut 56 will traverse the screw 55 upwardly causing clockwise rotation of output shaft 63 and drive arm 5B. Conversely, opposite rotation of motor 16 will cause ball nut 56 to traverse the screw 55 downwardly effecting counter-clockwise rotation of output shaft 63 and drive arm 5B. During such operation, mounting plate 54 carrying motor 16, screw 56 and associated parts will be tilted in one direction or the other as arm 64 is angularly positioned due to the rectilinear movement of ball nut 56 relative to screw 55.

Figure 8:
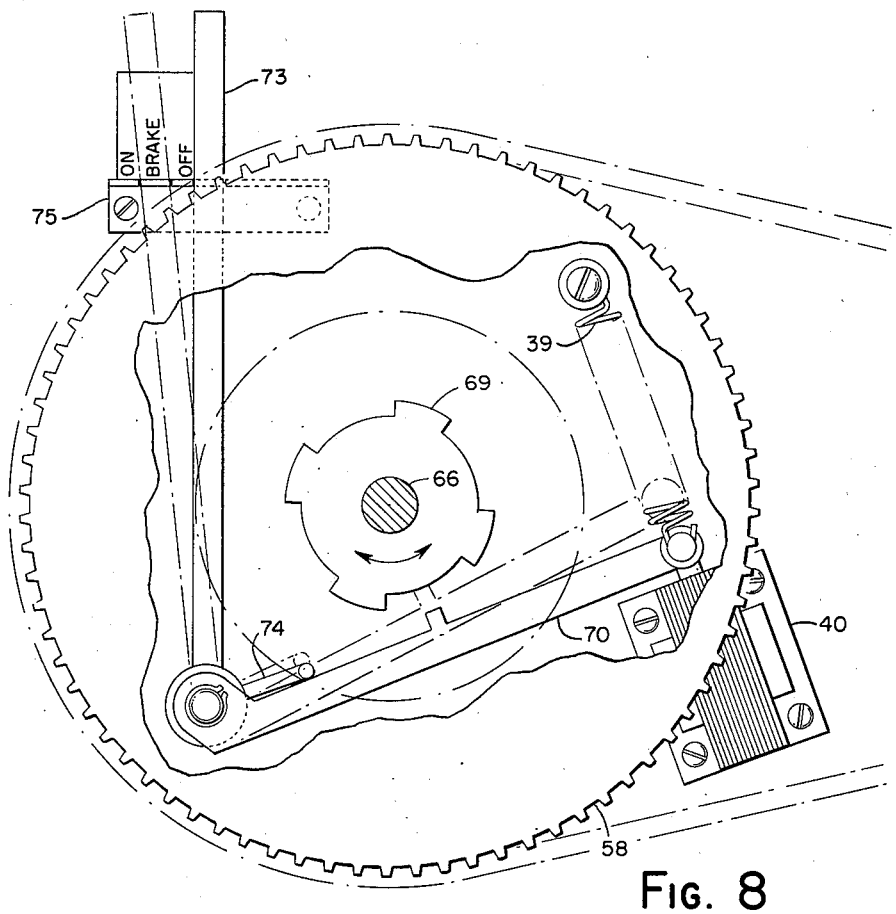
FIG. 8 is a partial plan view of the control drive shown in FIG. 6 with certain parts broken away.
Figure 9:
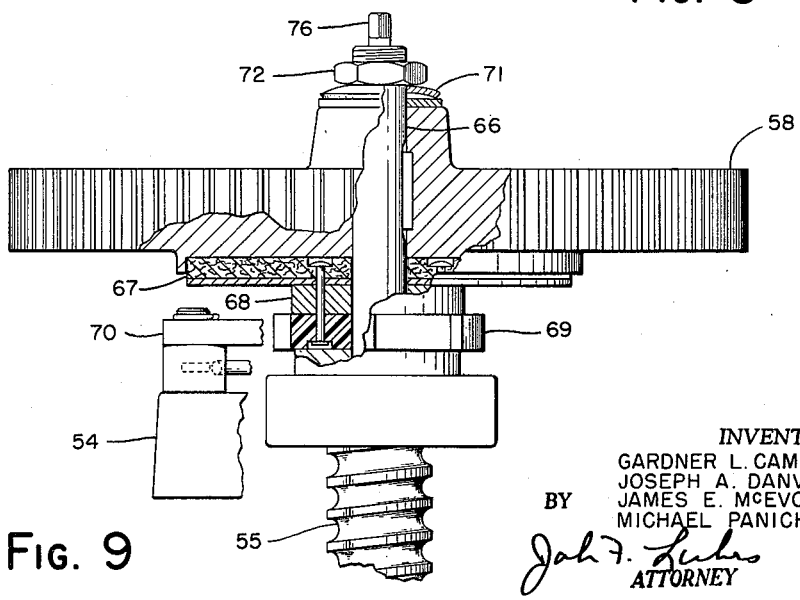
FIG. 9 is a fragmentary view of the friction brake incorporated in the control drive shown in FIG. 6.

In FIGS. 8 and 9 we show to larger size the driving connection between driven sprocket 58 and screw 55 as well as the braking mechanism for holding the drive in position upon power failure or during periods of "Hand" operation. As shown, the driven sprocket 58 is keyed to an extension 66 of screw 55 to provide a direct driving connection, but to allow for limited axial movement on the extension 66. Journaled about the extension 66 and normally rotating therewith through a disc brake 67 is a drum 68 carrying a toothed wheel 69. Cooperating with the toothed wheel 69 is a detent 70 pivotally supported on mounting plate 54. During normal operation the detent 70 is held out of engagement with toothed wheel 69 by solenoid 40. Upon de-energization of solenoid 40 detent 70 is brought into engagement with toothed wheel 69 by means of spring 39. Upon such operation a braking force is applied through disc brake 67 bringing the drive to a rapid yet smooth stop without placing the mechanism under undue strain. Disc brake 67 may be adjusted as required to obtain the desired braking action by varying the loading of a spring washer 71 under the control of an adjusting nut 72.

Detent 70 can be manually held out of engagement, despite de-energization of solenoid 40, by means of pivoted hand lever 73 in driving relation with the detent 70 through a spring 74. A notched plate 75 is provided having "on" and "off" positions for holding lever 73 in either selected position.

The extension 66 is provided with a square end 76 for receiving a hand crank (not shown) for manually rotating screw 55 to angularly position drive arm 5B The motor 16, shown in FIG. 6, may be provided with a suitable control circuit as described with reference to FIG. 1.

What we claim as new and desire to secure by Letters Patent of the United States is:

1. A control drive comprising, in combination, a support, an electric motor mounted on said support, an elongated threaded shaft rotatably mounted in said support, a driving connection between said motor and said shaft operative to transmit motion therebetween and to effect a torque multiplication, a carriage member having threaded engagement with said shaft for rectilinear movement relative thereto upon rotation of said shaft to effect an additional torque multiplication, means responsive to displacement of said carriage for producing additional torque multiplication and for producing an output motion, a toothed wheel rotatedly mounted on such shaft, a friction member providing a driving connection between said shaft and toothed wheel, a lever pivotally mounted on a fixed support adjacent to said toothed wheel, a detent member carried by said lever for engagement with the teeth of said toothed wheel, and a solenoid for actuating said lever to effect engagement of said detent with the teeth of said toothed wheel to oppose rotation of said shaft.

2. A motor operated control drive for positioning dampers and the like comprising, in combination, a first fixed support, a bearing plate pivotally mounted on said support, a screw rotatably journaled in said bearing plate, a nut engaging said screw longitudinally traversing said screw between limits as said screw rotates in said bearing plate, a reversible motor mounted on said bearing plate, a driving connection between said motor and said screw, a second fixed support, a shaft pivotally mounted in said support, a drive arm fixedly secured to said shaft and pivotally connected to said nut whereby said shaft is angularly positioned as said nut traverses said screw, a cam angularly positioned by said drive arm, means operated by said cam producing a signal varying in functional relationship to changes in the angular position of said drive arm and an output arm secured to said shaft and angularly positioned therewith.

3. A motor operated control drive for positioning dampers and the like comprising, in combination, an A-frame forming an isosceles triangle, a first shaft pivotally mounted in said A-frame at the apex of said triangle, an arm extending outwardly from one of the legs ef equal length of said A-frame, a bearing plate pivotally supported in said arm, a screw rotatably mounted in said bearing plate, a nut engaging said screw and longitudinally traversing said screw as said screw rotates, a drive arm secured to said first shaft and pivotally connected to said nut disposed in a plane perpendicular to the base of said A-frame when said nut is substantially midway between the ends of said screw, an output arm secured to said first shaft, a reversible motor carried by said bearing plate, a driving connection between said screw and said motor, a cam angularly positioned by said output arm and means operated by said cam producing a signal varying in functional relation to changes in the angular position of said drive arm.

4. A control drive as claimed in claim 2 wherein said first fixed support is so located with respect to said second fixed support that the axis of said screw is at a substantially right angle to the center line of said drive arm when said nut is midway between said limits.

5. A control drive as claimed in claim 4 including a toothed wheel rotatably mounted on said screw, a friction drive between said toothed wheel and screw, a detent normally disposed to engage said toothed wheel to inhibit rotation of said wheel and means for holding said detent out of engagement with said wheel.

6. A control drive as claimed in claim 5 wherein said motor is an electric motor and said detent is held out of engagement with said wheel by means responsive to the energization of said motor.

7. A control drive as claimed in claim 2 wherein the driving connection between said motor and screw comprises a driven sprocket fixedly mounted on said screw, a drive sprocket rotated by said motor and a ribbed belt engaging said drive and driven sprockets.

8. A control drive as claimed in claim 2 wherein said nut is a ball nut.

References Cited by the Examiner
UNITED STATES PATENTS

| | | | |
|---|---|---|---|
| 602,262 | 4/1898 | La France | 74—424.8 |
| 2,351,997 | 6/1944 | Morrill | 192—2 |
| 2,387,713 | 10/1945 | Bradford | 74—424.8 X |
| 2,602,664 | 7/1952 | Matchett | 74—424.8 X |
| 2,937,538 | 5/1960 | Worrall | 74—231 |

MILTON KAUFMAN, *Primary Examiner.*

BROUGHTON G. DURHAM, *Examiner.*

F. E. BAKER, *Assistant Examiner.*